United States Patent [19]

Gazda

[11] 4,294,598

[45] Oct. 13, 1981

[54] APPARATUS FOR THE SEPARATION OF GAS MIXTURES, PARTICULARLY THE ENRICHMENT OF A GAS MIXTURE IN A COMPONENT CONTAINING URANIUM 235

[76] Inventor: Hans O. E. Gazda, Anton-Krieger-Gasse 155, A-1238 Wien, Austria

[21] Appl. No.: 59,055

[22] Filed: Jul. 19, 1979

Related U.S. Application Data

[62] Division of Ser. No. 889,395, Mar. 23, 1978, Pat. No. 4,225,324.

[30] Foreign Application Priority Data

Mar. 24, 1977 [AT] Austria ................................ 2076/77

[51] Int. Cl.³ .............................................. B01D 45/14
[52] U.S. Cl. ........................................ 55/403; 55/407; 55/DIG. 14
[58] Field of Search .................... 55/17, 400, 401, 403, 55/406, 407, 409, DIG. 14; 210/380 R; 209/144; 233/DIG. 1

[56] References Cited

U.S. PATENT DOCUMENTS

| | | | |
|---|---|---|---|
| 599,725 | 3/1898 | Naylor, Jr. ..................... | 210/380 R |
| 1,700,928 | 2/1929 | Fawkes ................................. | 55/17 |
| 2,392,124 | 1/1946 | Denys ................................. | 55/406 |
| 3,498,454 | 3/1970 | Timson ................................ | 55/17 |

FOREIGN PATENT DOCUMENTS

| | | | |
|---|---|---|---|
| 73657 | 9/1916 | Austria ................................ | 55/407 |
| 173438 | 6/1952 | Austria ................................ | 55/407 |
| 238697 | 7/1964 | Austria ................................ | 55/400 |
| 1262921 | 3/1968 | Fed. Rep. of Germany ...... | 209/144 |
| 1205830 | 5/1956 | France .................................. | 55/17 |

*Primary Examiner*—David L. Lacey
*Attorney, Agent, or Firm*—Karl F. Ross

[57] ABSTRACT

An apparatus for separating a gas mixture into a heavy component and a light component, especially for the enrichment of a gas mixture in uranium 235 in which the uranium isotopes are provided in the form of uranium hexafluoride, comprises a cascade of centrifuge stages each formed by a pair of spaced-apart disks surrounded by a housing and driven by a common shaft from a motor. The relatively narrow passage between each pair of disks opens into a greater space which cooperates with the gas along the periphery of the disk as held in place by the housing to form a boundary layer with the heavy component tending to diffuse out of the layer. Means is provided to collect the light component in the boundary layer.

5 Claims, 5 Drawing Figures

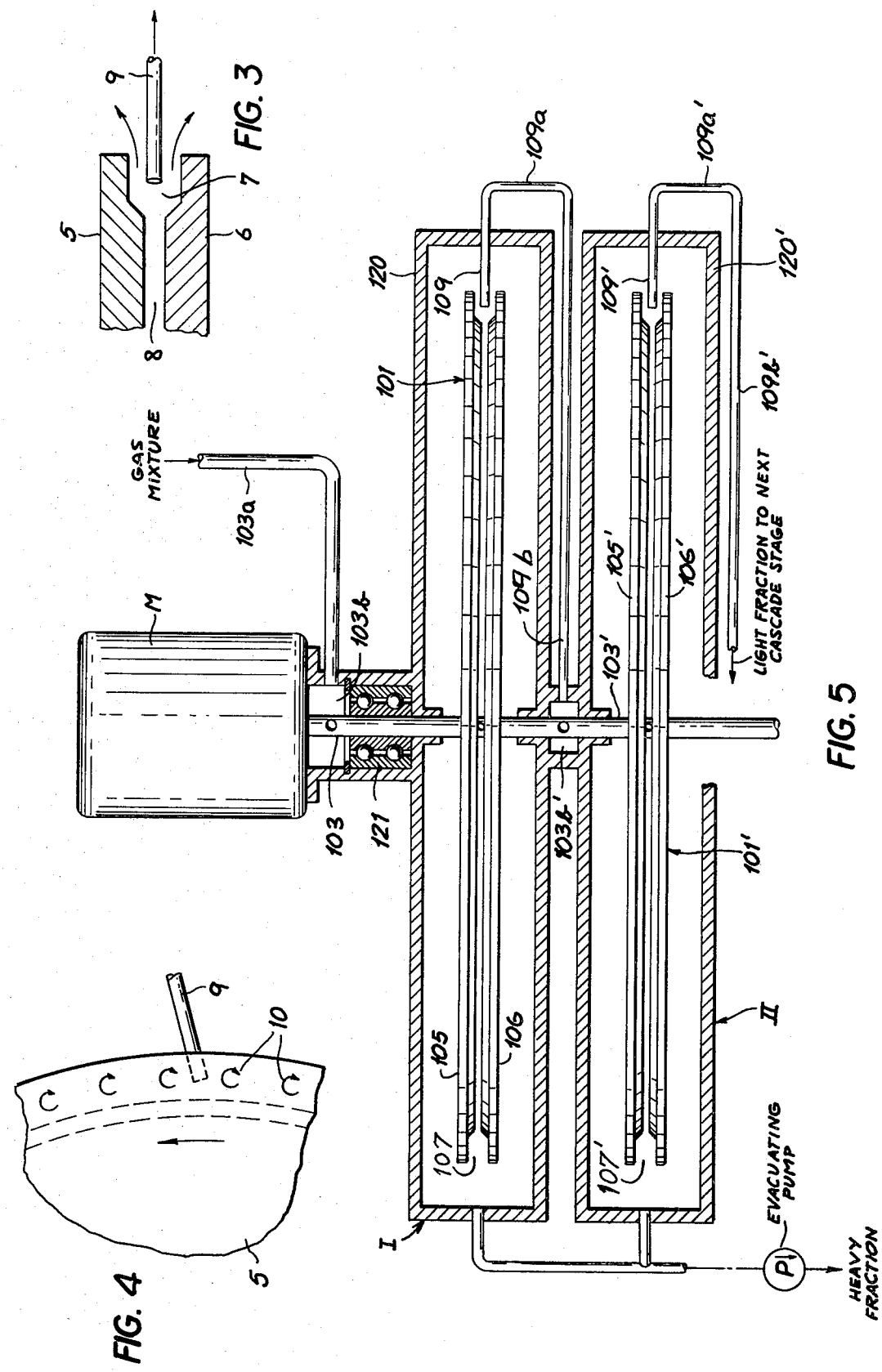

APPARATUS FOR THE SEPARATION OF GAS MIXTURES, PARTICULARLY THE ENRICHMENT OF A GAS MIXTURE IN A COMPONENT CONTAINING URANIUM 235

This is a division of application Ser. No. 889,395, filed Mar. 23, 1978, now U.S. Pat. No. 4,225,324.

FIELD OF THE INVENTION

The present invention relates to an apparatus for the separation of gas mixtures and, more particularly, the enrichment of a gas mixture in one of its components. The invention is particularly directed to the separation or enrichment of isotope mixtures and especially to the enrichment of a gas mixture in a light component consisting of the hexafluoride of uranium 235.

BACKGROUND OF THE INVENTION

For the enrichment of the uranium 235 content in a mixture of isotopes of uranium, the principal technique presently used is the diffusion process. It has also been proposed to use the so-called gas-centrifuge process and/or the separating-nozzle process for this purpose. Because all three processes are characterized by a low separation coefficient or separation effect and a low throughput, a large number of separating stages must be connected in cascade to achieve the desired enrichment in the uranium 235 component. All of these systems have a high energy consumption and considerable capital cost.

In Austrian Pat. No. EO-PS 238,697, there is described an apparatus for the separation or enrichment of gaseous mixtures in one of its components. This apparatus comprises a disk rotating at high speed and provided with radial passages to which the gas mixture is fed centrally into an annular compartment. The nozzle gap of this disk, which extends in the radial direction, conducts the heavy fraction generally centrally outwardly while to either side of the nozzle gap, there are provided discharge passages for the light fraction of the mixture. This system has, however, not found significant utility in isotope separation and, more specifically, for the separation of uranium isotopes.

OBJECT OF THE INVENTION

It is an object of the invention to provide an improved apparatus for the separation or enrichment of uranium isotopes whereby the disadvantages of conventional processes can be avoided and an improved uranium isotope separation or enrichment of a gas mixture in uranium 235 can be achieved with relatively low capital costs and specific energy consumption.

SUMMARY OF THE INVENTION

This object is attained, in accordance with the present invention, with an apparatus for separating gaseous mixtures having a light fraction and a heavy fraction and, more specifically, an apparatus for enriching a gas mixture in one of its fractions, where the two fractions are characterized by different specific gravities. Preferably the system is used for enriching a gas mixture in the uranium 235 isotope where the mixture consists of the different uranium isotopes in the form of uranium hexafluoride. According to the invention, the gaseous mixture is accelerated radially in a centrifuge and at the discharge side of the centrifuge along the periphery thereof, an opening is provided at which the two fractions are at least partially separated from one another. This is achieved by providing means for inducing at the discharge side of the centrifuge, along the aforementioned periphery, the gas mixture to generate a turbulent flow which has a boundary layer in contact with the periphery of the centrifuge and the walls of the opening while the heavy component of the gas mixture tends to diffuse out of this boundary layer as a result of the interplay between the centrifugal force generated by rotation of the centrifuge and the centrifugal force generated within the turbulence or eddy currents. The light fraction is thus enriched in the boundary layer and, according to the invention, it is collected and conducted away.

In the outer space of the system, i.e. the space between the rotating disk of the centrifuge and the generally stationary housing or receptacle within which the disk rotates, the gas has a pressure of say, 5 Torr which is subjected to a radial pressure increase. This pressure increase results from the rotation of the disk. The processed gas which is radially discharged from the disk thus meets this gas mass in the space between the disk and the housing and engages in an exchange therewith. Because of the pressure in this outer space the boundary layer is held against the surface (edge) of the rotating disk.

The aforedescribed eddy currents have a smaller mass density that the surrounding gas. This generates a force which acts opposite the centrifugal force to hold the boundary layer against the disk edge. In the region of the discharge openings, which are disposed close to the surface of the disk, the eddy currents are displaced by laminar shear flow which allows the discharge device to effectively strip the laminar boundary layer from the region of the surface of the disk. It should be noted that the stripping or discharge device need not be directly adjacent the edge of the disk since the substantially laminar boundary layer progressively widens outwardly from the disk until it is transformed into a turbulent boundary layer. In addition, the more the disk rotates, the greater will be the boundary layer thickness and hence the stripper need merely remove a portion of this boundary layer as it sweeps past the stationary stripping device disposed along the periphery of the disk to recover a fraction which is enriched in the light component.

The stripping device can substantially completely remove the boundary layer while the remaining proportion of the gas is freely accelerated outwardly to cause turbulence.

It has been found to be important to recover only the boundary layer since, depending upon the flow characteristics, the structure of the turbulence may vary widely during operation. However, the boundary layer at the disk has a substantially homogeneous composition and a substantially uniform eddy current formation with a substantially smaller degree of turbulence than the potential flow outwardly thereof. As a consequence, the boundary layer is significantly enriched in the light component to a substantially uniform extent.

The present invention also provides an apparatus for carrying the aforedescribed process, the apparatus comprising a centrifuge having a circumferentially extending disk rotatable at high speed and provided with a gas passage extending radially outwardly and communicating with an inlet for the gaseous mixture at substantially the center of the disk. According to the invention, directly along the outer periphery of the disk, at least one stripping device is provided for recovering the light fraction of the mixture from the boundary layer of the gas in the region of this periphery.

According to a feature of the invention, the passage widens at the outer periphery of the disk and the stripper reaches into this widening portion of the passage.

BRIEF DESCRIPTION OF THE DRAWING

The above and other objects, features and advantages of the present invention will become more readily apparent from the following description, reference being made to the accompanying drawings in which:

FIG. 3 is a detail view of the periphery of a centrifuge disk shown in cross section;

FIG. 4 is a plan view of the portion of the disk shown in FIG. 3; and

FIG. 5 is an axial cross-sectional view illustrating another embodiment of the invention.

SPECIFIC DESCRIPTION

Figure 1:
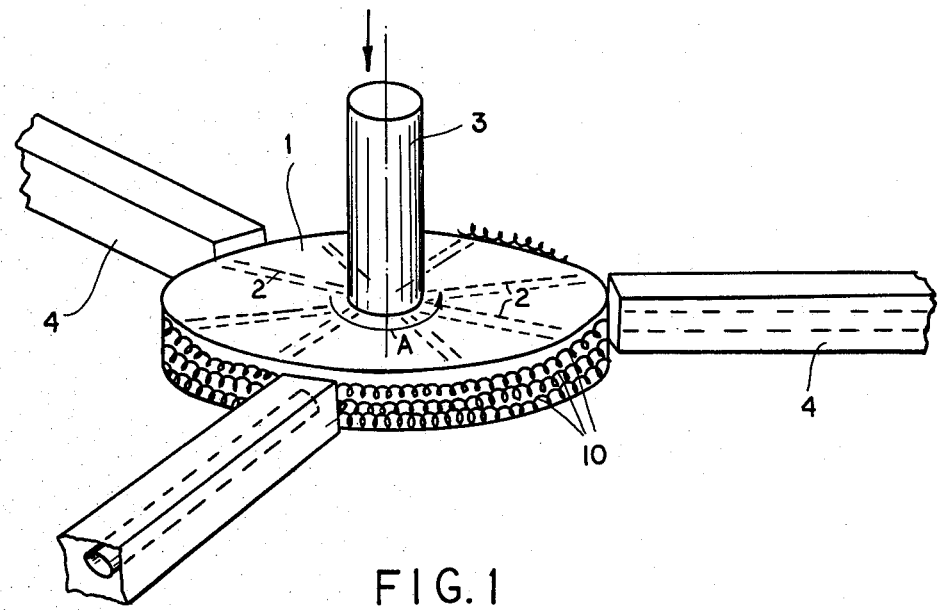
FIG. 1 is a schematic perspective view of an apparatus embodying the invention.

The apparatus shown in FIG. 1 comprises basically a disk 1 which can be of the type described in the aforementioned Austrian patent or of some other construction. The disk 1 which is rotataed about a vertical axis and is generally horizontal, is driven in the counterclockwise sense as viewed in FIG. 1 (arrow A) at high angular velocity. Within the disk 1 there are provided radially extending passages 2 which can lie, if desired, in a plurality of planes. At substantially the center of the disk, there is provided an inlet passage 3 whereby the gas mixture to be separated is fed to the radial passages.

Figure 2:
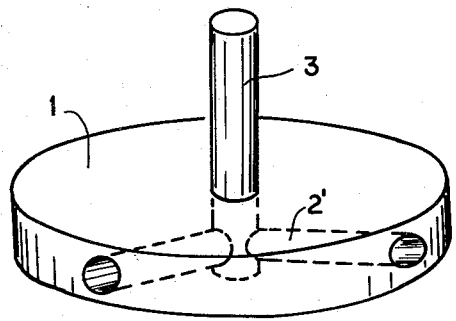
FIG. 2 is a diagrammatic perspective view showing a modification of the system of FIG. 1.

As can be seen in FIG. 2, the passages 2' can be formed as tubes leading outwardly from the inlet tube 3.

The gas mixture supplied via the feed passage 3 is compressed in the disk 1 and accelerated radially outwardly.

At the discharge edge of the disk, the gases emerge and form into a turbulent boundary layer as a result of the exchange effect with the gases in the space surrounding the disk. This space may be enclosed by a housing (see FIG. 5).

As a result, there is formed a vortex flow of gas which rotates within the toroidal pattern at high speed, the heavy fraction diffusing outwardly so that a light fraction hugs the periphery of the disk as a boundary layer. Stripper means, in the embodiment shown consisting of three stripping tubes 4, is mounted on the housing and spaced around the disk while reaching within the turbulence stream around the disk to substantially the boundary layer so that the boundary layer may be drawn off.

In FIG. 3, the disk 1 is shown to consist of two plates 5 and 6 which define between them an annular passage 8 extending radially outwardly and through which the gas mixture is accelerated. At the periphery of the disk 1, the passage 8 widens as shown at 7. As a result of this spreading of the passage, the turbulent vortices 10 are formed within the widened portion of the passage. Since these vortices rotate at high speed, the heavy component is forced outwardly so that a light component fraction lies relatively inwardly and can be stripped by the duct 9 which reaches into the widened portion 7 of the passage. The enlargement 7 of the passage appears to limit the vortex formation substantially to the region in which the cross section of the passage is increase.

The apparatus of the present invention is preferably operated at a subatmospheric pressure. In addition, a plurality of disks 1 can be mounted upon a single shaft and connected to form an enrichment cascade.

Such a cascade arrangement has been illustrated in FIG. 5 in which the shaft is shown to be driven by a motor M.

In this embodiment, the shaft is provided in sections 103 and 103' formed with axial bores radially opening into gas distributors 103b and 103b'. The two stages of the cascade illustrated in FIG. 5 are represented at I and II, respectively, although it will be understood that a substantially larger number of cascade stages may be provided if desired.

The gas mixture is fed by a pipe 103a into the distributor 103b form which the gas enters the passage 103 and flows into a radially extending space between the two members 105, 106 of the disk 101. The radial passage widens at 107 and a stripper 109 reaches into this enlargement to recover the light fraction therefrom. The disk 101 is surrounded by an evacuated housing 120 which is maintained under subatmospheric pressure by an evacuating pump which also serves to draw the heavy fraction from the system. However, the pressure within the housing 120 immediately around the periphery of the disk is sufficiently great as to retain the boundary layer containing the light fraction practically entirely within the enlargement 107 of the radial passage.

The light fraction is conducted away via a piper 109a and is fed as shown at 109b to the distributor 103b' feeding this light fraction-enriched gas mixture to the passage 103' communicating with the radial passage of the next disk 101'.

The disk 101', which is also mounted upon the shaft, includes disk members 106' and 105'. The widening 107' of the radial passage discharges the gas mixture which again forms a boundary layer enriched in the light component. This light component is stripped from within the passage 107' via the stripper tube 109'. The gas mixture led away by the pipe 109a' is thus further enriched in the light fraction and may be supplied at 109b' to yet a further stage. As the gas mixture is treated in stage after stage, the enrichment in uranium 235 hexafluoride increases to the desired level. In this type of cascade arrangement, the heavy fraction withdrawn from each subsequent cascade stage has a higher proportion of the light fraction than the previous cascade stage so that it may be mixed with the light fraction entering the previous cascade stage so as to increase the separation effectiveness. In other words, the light fraction admitted to each cascade stage after the first may be mixed with a heavy fraction from a cascade stage downstream thereof. Applying this principle to the embodiment of FIG. 5, the heavy fraction withdrawn from stage II may be mixed with the mixture entering the duct 103a and stage I.

The apparatus shown in the drawing has been found to give especially effective uranium enrichment with minimum specific energy consumption and investment cost.

I claim:

1. An apparatus for separating a light component from a heavy component in a gas mixture, said apparatus comprising:

a housing; a shaft rotatable about an upright axis; and extending into said housing;

a motor operatively connected to said shaft for rotating same;

a plurality of axially spaced centrifuge disks positioned in said housing and mounted on said shaft and rotatable therewith, each of said disks being formed with a radial passage extending from a central portion of the respective disk outwardly and opening into a peripheral compartment of greater axial width than the passage at the outer periphery of the respective disk;

means for feeding said gas mixture centrally to a first of said disks for acceleration outwardly through its radial passage whereby a turbulent flow is formed along the peripheral compartment of said first of said disks;

means in said housing for recovering a light component from said mixture through the passage of said first of said disks and including a duct reaching into said boundary layer from said housing at a location thereon radially outwardly of said one of said disks;

means for feeding the light component collected from the boundary layer of said first of said disks and supplying it centrally to a second of said disks for acceleration through the passage of said second of said disks whereby another boundary layer is maintained adjacent the periphery of said second of said disks by the interaction of the accelerated light component in said second of said disks and the surrounding body of gas retained by the respective compartment of said housing; and a further duct reaching radially from said housing into said boundary layer of said second of said disks to collect a light component therefrom whereby said disks are connected in cascade for multistage recovery of said light component from said mixture.

2. The apparatus defined in claim 1 wherein each of said disks comprises a pair of spaced-apart plates defining the respective radial passage between them.

3. The apparatus defined in claim 2; further comprising means for removing a heavy component from the region adjacent the periphery of each disk at a location axially spaced from the means for recovering the respective light component.

4. The apparatus defined in claim 1 wherein each of said plates has a plurality said of radially extending passages.

5. The apparatus defined in claim 1, further comprising means for applying a subatmospheric pressure to said housing.

* * * * *